(12) United States Patent
Haase et al.

(10) Patent No.: US 11,159,087 B2
(45) Date of Patent: Oct. 26, 2021

(54) SWITCHING REGULATOR CIRCUIT, FIELD DEVICE AND POWER SUPPLY METHOD

(71) Applicant: Endress+Hauser Conducta GmbH+Co. KG, Gerlingen (DE)

(72) Inventors: Björn Haase, Stuttgart (DE); Manuel Schmittner, Altbach (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/829,328

(22) Filed: Mar. 25, 2020

(65) Prior Publication Data
US 2020/0313558 A1 Oct. 1, 2020

(30) Foreign Application Priority Data
Mar. 26, 2019 (DE) ..................... 10 2019 107 761.3

(51) Int. Cl.
*H02M 3/158* (2006.01)
*G01D 21/00* (2006.01)
*H04L 12/40* (2006.01)

(52) U.S. Cl.
CPC .......... *H02M 3/1584* (2013.01); *G01D 21/00* (2013.01); *H04L 12/40* (2013.01)

(58) Field of Classification Search
None
See application file for complete search history.

(56) References Cited

U.S. PATENT DOCUMENTS

| 5,592,072 | A | 1/1997 | Brown | |
|---|---|---|---|---|
| 9,698,672 | B2 * | 7/2017 | Chung | ............. H02M 3/156 |
| 9,991,790 | B2 * | 6/2018 | Chung | ............. G05F 1/461 |
| 2007/0114981 | A1 * | 5/2007 | Vasquez | ............. H02M 3/158 |
| | | | | 323/266 |
| 2009/0256545 | A1 * | 10/2009 | Wang | ............. H02M 3/33507 |
| | | | | 323/299 |
| 2011/0156668 | A1 | 6/2011 | Bergveld et al. | |
| 2012/0169304 | A1 | 7/2012 | Isik | |
| 2015/0364989 | A1 * | 12/2015 | Chung | ............. H02M 1/4225 |
| | | | | 363/44 |

FOREIGN PATENT DOCUMENTS

| DE | 102004038597 A1 | 3/2006 |
|---|---|---|
| DE | 102006056175 A1 | 5/2008 |
| EP | 0699986 A2 | 3/1996 |
| WO | 9302407 A1 | 2/1993 |

* cited by examiner

*Primary Examiner* — Jeffrey A Gblende
(74) *Attorney, Agent, or Firm* — Mark A. Logan; Endress+Hauser (USA) Holding Inc.

(57) ABSTRACT

The present disclosure discloses a switching regulator circuit comprising: a series regulator having at least one regulating transistor with the connections collector, base and emitter; and a DC-DC converter, in particular a step-down converter, which is connected downstream of the series regulator, wherein the switching regulator circuit is designed such that the DC-DC converter is regulated to a constant collector-emitter voltage drop across the regulating transistor; in particular, the DC-DC converter is activated such that a constant collector-emitter voltage drop results. In addition, the present disclosure also discloses a corresponding method.

21 Claims, 4 Drawing Sheets

SWITCHING REGULATOR CIRCUIT, FIELD DEVICE AND POWER SUPPLY METHOD

CROSS-REFERENCE TO RELATED APPLICATION

The present application is related to and claims the priority benefit of German Patent Application No. 10 2019 107 761.3, filed on Mar. 26, 2019, the entire contents of which are incorporated herein by reference.

TECHNICAL FIELD

The present disclosure relates to a switching regulator circuit and a field device having a switching regulator circuit and to a method for supplying power to a field device.

BACKGROUND

A field device is a technical device in the field of automation technology, which is directly related to a production process. In automation technology, "field" designates the area outside of switchgear cabinets or control rooms. Field devices can thus be actuators (control elements, valves, etc.) as well as sensors or measuring transducers in factory and process automation.

In general, a measuring transducer is a device that converts an input variable into an output variable according to a fixed relationship. The English term "transmitter" is also frequently used. In this respect, for example, the "Liquiline M CM42" product of the applicant is to be mentioned as an example of a measuring transducer for pH/redox, conductivity or oxygen measurements in process automation applications.

The measuring transducer can be designed as a two-wire measuring transducer (also referred to as a two-wire) with a 4.20 mA signal (current signals according to DIN IEC 60381-1). In such systems, the output variable, encoded in a current value, is transmitted in an analog manner. In many cases, digital field bus communication according to the HART standard is also used in these systems.

The measuring transducer includes one or more switching regulators for supplying power to circuit parts connected downstream of the switching regulators, for example, a circuit for communication, a microcontroller or for forwarding to a sensor connected to the measuring transducer.

Switching regulator circuits in two-wire transmitters must meet the requirements of high efficiency, in particular in the case of a 3.6 mA fault current, and smallest input voltage (e.g., 12 V), absence of feedback to the HART field bus, stability during operation even when controlling large energy buffers and in the case of a large input voltage range, e.g., 12 V to 60 V, and in the case of extreme interference signals in the supply lines. In addition, it must be possible for available overcapacities to be reliably extracted (e.g., more power must be able to be extracted at 30 V operating voltage and 22 mA loop current than the transmitter circuit actually consumes). It should be kept in mind that the transmitter may have to be integrated into an explosion protection concept.

One requirement is that the power supply circuit often also has to provide an energy buffer to the circuit system in order to be able to also at least briefly support operating modes which cannot be supplied from the energy budget of, for example, 3.6 mA at 12 V, e.g., during the erasure of flash memories.

SUMMARY

The present disclosure is based on the task of providing a switching regulator circuit that overcomes the disadvantages of the prior art. Thus, the switching regulator circuit is to be designed to be energy-efficient, intrinsically safe if necessary, and is to always provide sufficient power and, if necessary, is to also provide the transmitter circuit with an energy buffer for transient peak currents.

The task is achieved by means of a switching regulator circuit comprising: a series regulator having at least one regulating transistor with the connections collector, base and emitter, and a DC-DC converter, in particular a step-down converter, which is connected downstream of the series regulator, wherein the switching regulator circuit is designed such that the DC-DC converter is regulated to a constant collector-emitter voltage drop across the regulating transistor; in particular, the DC-DC converter is activated such that a constant collector-emitter voltage drop results.

Typically, DC-DC converters are used in the application context of the present disclosure as integrated circuits using coils. Typically, such converter circuits are used in an operating mode in which a constant output voltage is regulated. For this purpose, such DC-DC converter circuits have a control signal input (voltage feedback input), which is fed back via the output voltage present at the output of the DC-DC converter. Thus, the DC-DC converter can regulate the output voltage to the desired constant value.

In the case of so-called "hysteresis converters," the regulation takes place in that when an undervoltage is detected at the output, the converter is activated (and energy is transmitted to the output) and the regulator is switched off again when the target value is exceeded (with a certain hysteresis).

However, in the case of the present application, the DC-DC converter is connected differently in such a way that it is diverted from its intended use and not regulated to a constant output voltage, but rather to a constant voltage drop across the input of the series regulator connected upstream of the DC-DC converter.

Many subcomponents must be taken into account for the efficiency of the design of a DC-DC converter. This includes in particular the selection of the coils and their associated saturation currents, the ferrite materials and the working currents used in converter operation. Such subcomponents must be matched to one another for optimum efficiency so that, for example, the magnetizing current in the coil assumes the optimum value in terms of efficiency. In the context of this application, the term "working current" refers to the design of the DC-DC converter introduced into the coils.

The transistor in the series regulator (also referred to below as the regulating transistor) can be designed as a bipolar transistor or as a field-effect transistor (unipolar transistor). For the purposes of this application, a transistor always refers to a bipolar transistor or unipolar transistor. Accordingly, in the case of the field-effect transistor, the base shall be referred to as gate, the collector as drain and the emitter as source.

One embodiment provides: a comparator, wherein the comparator compares the collector-emitter voltage drop across the regulating transistor to a target value and an output of the comparator is connected to a control input of the DC-DC converter.

One embodiment provides: a comparator having two inputs, wherein input is connected to the collector and the other input is connected to the emitter of the regulating transistor, and an output, the output of the comparator is connected to a control input of the DC-DC converter, wherein the comparator compares the voltage drop across the regulating transistor to a target value One embodiment provides: a microcontroller which specifies a target value for the collector-emitter voltage drop and passes it to the comparator, and comparing the target value of the collector-emitter voltage drop to the actual collector-emitter voltage drop; in particular, the target value for the collector-emitter voltage drop is subtracted from the voltage value at an input of the comparator.

One embodiment provides that the target value for the collector-emitter voltage drop is adjustable. Thus, the DC-DC converter is switched during operation between two operating modes for low power and high available power.

One embodiment provides that the control input of the DC-DC converter is designed as a voltage feedback control input.

One embodiment provides: a capacitor connected downstream of the DC-DC converter.

One embodiment provides: a voltage limiter, in particular a Z diode, which is connected downstream of the DC-DC converter.

One embodiment provides that the DC-DC converter comprises an input for adjusting the maximum working current of the DC-DC converter.

One embodiment provides that: a second comparator having two inputs and an output, wherein the comparator compares the voltage drop across the regulating transistor to a second target value, and an energy extraction circuit, wherein the output of the comparator is connected to the energy extraction circuit.

One embodiment provides: a second comparator having two inputs, wherein one input is connected to the collector and the other input is connected to the emitter, and an output, and an energy extraction circuit, wherein the output of the comparator is connected to the energy extraction circuit and the second comparator is designed such that the energy extraction circuit is controlled as a function of a second nominal voltage for the collector-emitter voltage drop.

One embodiment provides that the energy extraction circuit is designed as a second DC-DC converter.

One embodiment provides that the series regulator is designed as a cascode circuit, i.e., that a circuit topology with two regulating transistors is used instead of one regulating transistor.

One embodiment provides that the first and/or the second comparator is designed as a discretely constructed differential amplifier.

One embodiment provides that the first and/or the second DC-DC converter is designed as a hysteresis converter.

One embodiment provides that the first and/or the second DC-DC converter has a galvanic separation of the output voltage.

The task is further achieved by a field device, in particular a measuring transducer, comprising a switching regulator circuit as described above.

One embodiment provides that the field device is designed as a two-conductor field device, in particular as a two-conductor measuring transducer.

The task is further achieved by a method for supplying power to a field device, comprising the steps of setting a target value for a collector-emitter voltage drop of a series regulator, and regulating a DC-DC converter, in particular a step-down converter, to a constant collector-emitter voltage drop across the series regulator, in particular activating the DC-DC converter so that a constant collector-emitter voltage drop results.

One embodiment provides that the collector-emitter voltage drop is adjusted as a function of a current in the base or emitter of the series regulator. If the circuit is used in a two-conductor device, this corresponds to the impressed current, that is to say the loop current.

One embodiment provides that the collector-emitter voltage drop is dependent on a signal impressed into the current in the base or emitter of the series regulator. If the circuit is used in a two-conductor device, this corresponds to the analog or digital signal impressed on the loop current, such as the HART signal.

One embodiment provides the step of: comparing the target value of the collector-emitter voltage drop to the actual collector-emitter voltage drop, wherein in particular the target value is subtracted from the voltage value at an input of the comparator.

One embodiment provides the step of: adjusting the maximum output current at the DC-DC converter as a function of a current in the base or emitter of the series regulator and/or as a function of a signal impressed into the current in the base of the series regulator.

One embodiment provides: controlling an energy extraction circuit as a function of a second nominal voltage for the collector-emitter voltage drop.

One embodiment provides: the charging of an energy store by the DC-DC converter(s).

One embodiment provides: limiting the voltage across the DC-DC converter(s).

BRIEF DESCRIPTION OF THE DRAWINGS

This is explained in more detail with reference to the following figures.

DETAILED DESCRIPTION

In the figures, the same features are identified with the same reference signs.

The switching regulator circuit 1 is used in a measuring transducer 100, in particular a two-wire measuring transducer. The measuring transducer 100 is thus supplied with energy via the two lines, and the communication also takes place via the two lines. This can take place analogously over 4.20 mA, but also digitally by means of HART signals. If the communication takes place analogously, a current is supplied; for the purposes of this application, this current is designated by "ILoop." One of the two lines of the two-conductor is designated "In" in the figures.

Figure 1:
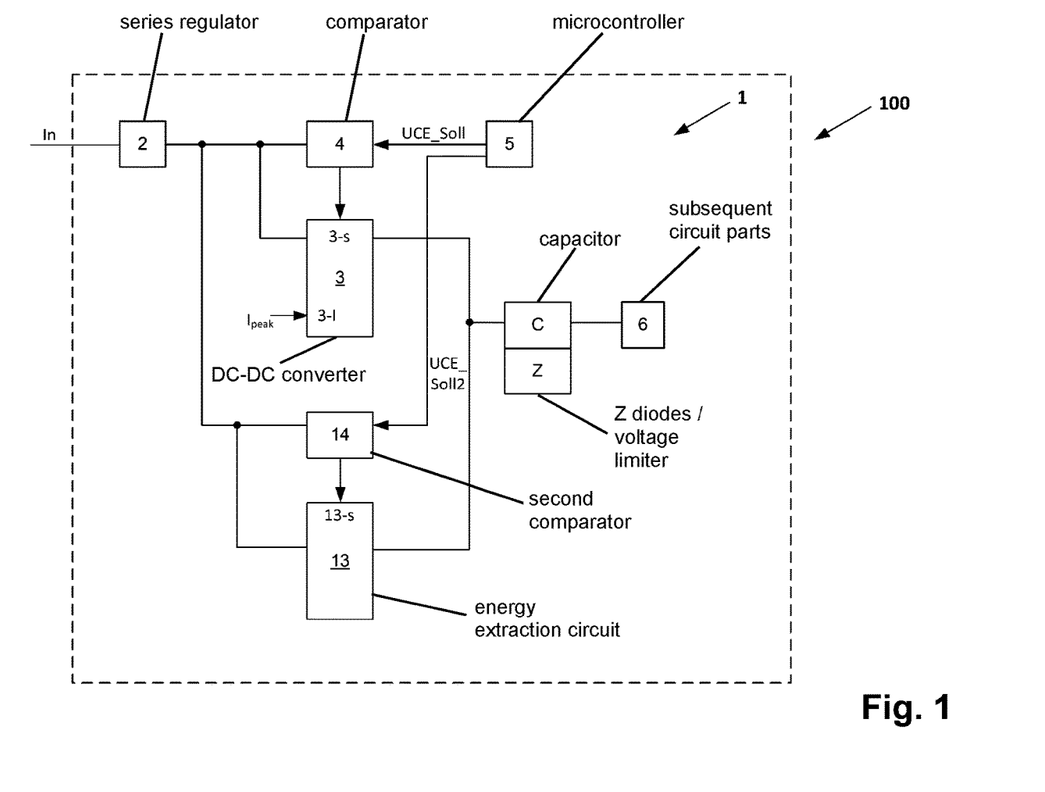
FIG. 1 shows a block diagram of the switching regulator circuit.
Figure 2:
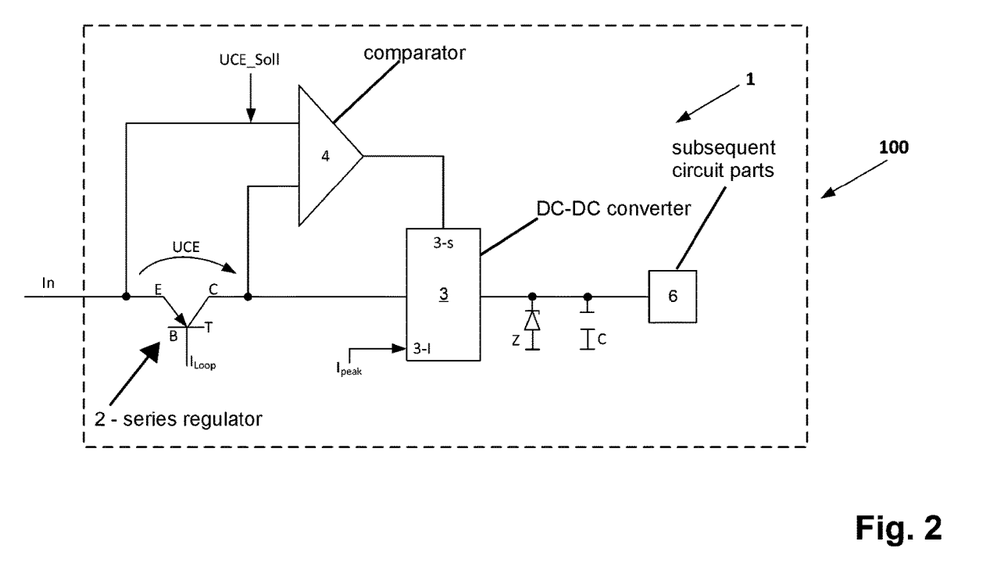
FIG. 2 shows an embodiment of the switching regulator circuit.
Figure 3:
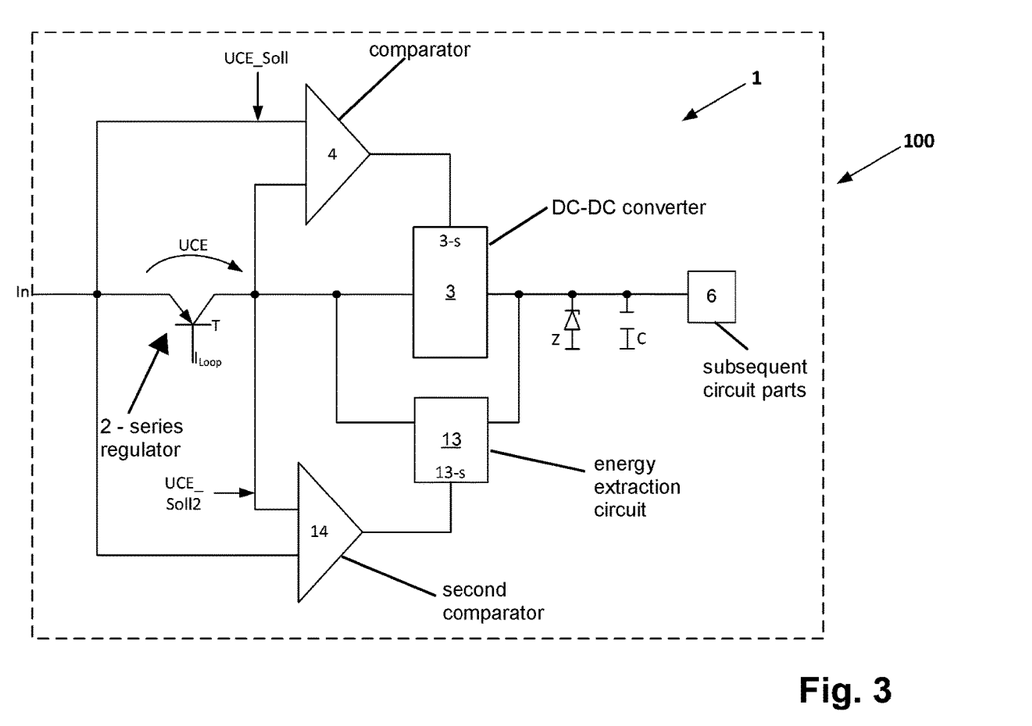
FIG. 3 shows an embodiment of the switching regulator circuit.
Figure 4:
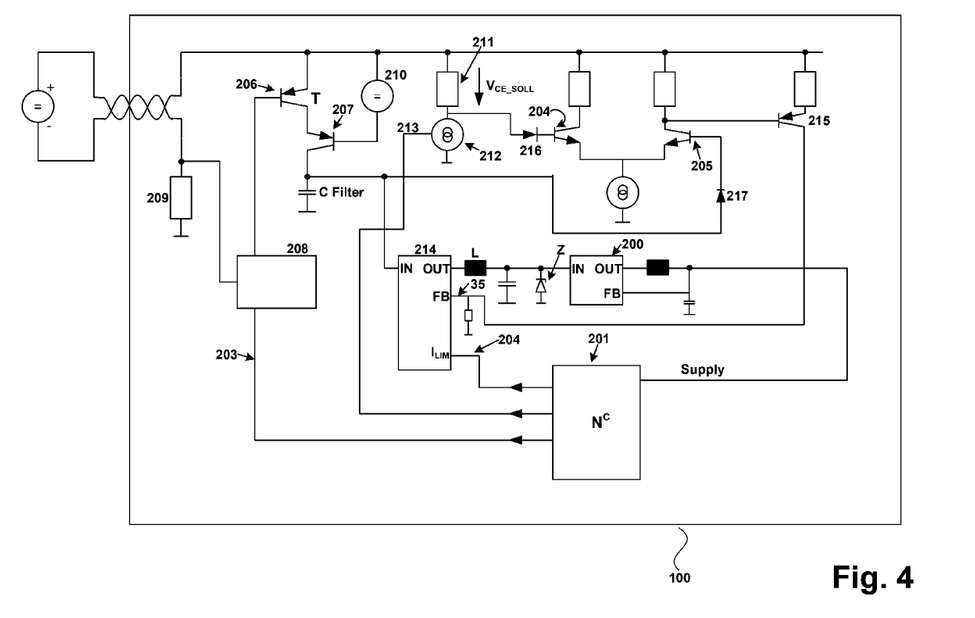
FIG. 4 shows an embodiment of a transmitter with the switching regulator circuit

FIG. 1 shows a block diagram of the inventive idea; FIGS. 2 to 4 show embodiments.

First, FIG. 2 is to be discussed with reference to FIG. 1.

The switching regulator circuit 1 first comprises a series regulator 2 which is connected to the input In. In FIG. 2, the series regulator 2 is designed as a bipolar transistor T, specifically as a pnp transistor. An npn transistor is also possible. The three connections are the collector C, base B and emitter E. The current for the communication, or also referred to as loop current ILoop, flows into the base B. The transistor T can also be designed as a field-effect transistor (unipolar transistor). For the purposes of this application, a transistor always alternatively refers to a bipolar transistor or a unipolar transistor. Accordingly, in the case of the field-effect transistor, base B shall be referred to as gate, collector C as drain and emitter E as source.

The collector-emitter voltage drop UCE is fed to the inputs of a comparator 4. The circuit 1 also comprises a microcontroller 5; a target value UCE_Soll for the collector-emitter voltage drop is defined in the microcontroller 5. This target value UCE_Soll is also fed to the comparator 4. The target value UCE_Soll is fed to an input of the comparator and is subtracted from the voltage value present there, in FIG. 2 from the voltage at the emitter E. Thus, comparator 4 compares the voltage at the collector C with the difference between the voltage at the emitter E and the target value. The target value could also be subtracted from the voltage value at the collector C.

The target value UCE_Soll of the voltage drop depends on the loop current ILoop and on whether a digital communication by means of HART is taking place at that moment. If the loop current is high, a correspondingly larger voltage drop is adjusted. If digital communication is taking place at that moment, a higher target value is also defined. The switchover can alternatively take place via an evaluation of the base current of the regulating transistor or via a separate control signal, as can be generated by a microcontroller.

A DC-DC converter 3 is connected downstream of the series regulator 2, wherein the collector C is connected to the input of the DC-DC converter 3 in the example. The DC-DC converter 3 is designed as a step-down converter.

The output of the comparator 4 is connected to a control input 3-S of the DC-DC converter 3. The DC-DC converter 3 is regulated to a constant collector-emitter voltage drop. In other words, the DC-DC converter 3 is activated in such a way that a constant collector-emitter voltage drop UCE results. In this case, the feedback control input of the DC-DC converter 3 can be used for activation. The feedback control input is often referred to as "FB" in the data sheets. Typically, the output voltage is adjusted via this input, but, in the present case, it is used for controlling, in order to also reduce the start-up time of the DC-DC converter.

The DC-DC converter 3 comprises an input 3-I with which the maximum working current of the converter 3 can be set in order to, for example, optimize the efficiency of the converter for a coil with a given saturation current. The control is carried out by parameterizing a current Ipeak impressed into the coil by the converter circuit. For example, the microcontroller 5 may set this value, optionally via a voltage divider. With a higher output current, the energy store C can be charged more quickly, see below.

With a low working current, the efficiency can be increased because the remagnetization losses in the coil are reduced, for example. However, if the working current is too low, the minimum power required for the stable operation of the series regulator cannot be extracted at the input of the DC-DC converter 3. If the DC-DC converter 3 does not take sufficient energy from the series regulator, the voltage drop UCE decreases and the nominal current to be adjusted or the digital HART signal in the current loop can thus be distorted. An increased output current of the DC-DC converter 3 prevents this, because a correspondingly increased input current is extracted by the DC-DC converter 3 at the output of the series regulator. In the case of an increased loop current, the optimization of the efficiency can optionally be dispensed with, because a higher power available for operation is achieved overall at the higher current.

One or more capacitors C is/are connected downstream of the DC-DC converter 3. They serve, on the one hand, to stabilize the voltage downstream of the DC-DC converter and to compensate for any voltage fluctuations. On the other hand, the capacitor C serves as an energy store for subsequent circuit parts, marked here by reference sign 6. Such circuit parts may, for example, be the aforementioned microcontroller 5, circuit parts for carrying out and activating the HART signal, for any connected display, wireless communication (for example, Bluetooth) or for supplying power to one or more sensors or flash memories connected to the measuring transducer 100.

One or more capacitors (designated as CFilter in FIG. 4 is/are connected between DC-DC converter 3 and series regulator 2; they also referred to as filter capacitors below). They serve to stabilize the voltage upstream of the DC-DC converter and to compensate for any voltage fluctuations which are generated by the DC-DC converter(s) 3 during the switching operation, and could possibly couple interference or interference signals into the current loop.

One or more circuit parts to a voltage limiter Z, for example, one or more Z diodes, is/are connected downstream of the DC-DC converter 3.

Voltage limiter Z and energy store C are connected in parallel.

The series regulator 2 may be implemented in a cascode circuit. In this case, the cascode circuit comprises two transistors connected in series, wherein one is operated in the emitter circuit and the other is operated in the base circuit.

FIG. 3 shows an embodiment, wherein only the differences from the embodiment in FIG. 2 are discussed below.

The circuit 1 comprises a second comparator 14 connected in parallel to the comparator 4, i.e., the voltages at the collector C and emitter E are fed to its inputs. The microcontroller 5 defines a second nominal voltage UCE_Soll2 for the collector-emitter voltage drop. The second nominal voltage UCE_Soll2 differs from the first nominal voltage UCE_Soll. The second nominal voltage UCE_Soll2 is advantageously lower. This second target value UCE_Soll2 is also fed to the second comparator 14. The target value UCE_Soll2 is fed to an input of the second comparator 14 and is subtracted from the voltage value present there, in FIG. 3 from the voltage at the collector C. Thus, the second comparator 14 compares the voltage at the emitter E with the difference between the voltage at the collector C and the second target value UCE_Soll2. The target value UCE_Soll2 could also be subtracted from the voltage value at the emitter E.

A type of bypass thus arises, wherein excess energy, which is not consumed by the DC-DC converter 3 at the input, is discharged to the energy store C.

The second target value UCE_Soll2 of the voltage drop depends on the saturation current of the regulating transistor T in the series regulator 2 and is advantageously smaller than the target value UCE_Soll. The task of the bypass is to quickly sufficiently discharge the filter capacitors, for example, when the voltage at the current loop fluctuates. If, for example, the externally supplied voltage present at the input of the series regulator 2 drops to a great extent, the voltage drop across the series regulator 2 drops at the same time and the switching regulator circuit 1 possibly can no longer readjust the desired loop current. Therefore, a large charge amount is to be extracted at the filter capacitor (i.e., a high current must flow) in order to restore the required voltage drop across the series regulator. The efficiency-optimized first DC-DC converter 3, with its coils and working currents, may not be able to extract a sufficiently high current, in particular if it is adjusted to a very low working current. This function is assumed by the bypass, which itself is designed as DC-DC regulator 13, but with a considerably higher working current and possibly considerably poorer efficiency.

This operating case (fluctuations of the externally supplied supply voltage) also shows that the use of the filter capacitor at the output of the series regulator 2 is associated with considerable disadvantages for the energy storage for operating modes with increased power requirement, because this energy store would have to be discharged very quickly (by a bypass) and the energy stored therein is then lost.

The energy store is placed only downstream of the DC-DC converter 3. A mandatory prerequisite for the use of the capacitor C at the output of the DC-DC converter 3 as an energy store is that it must be operated with a variable voltage, since energy can be extracted there only during discharge (falling voltage). This is only possible if the DC-DC converter 3 is operated in deviation from the usual operating mode and not with a regulation to a constant output voltage.

It is customary in the prior art to place the energy storage capacitor directly downstream of the series regulator 2 (in the nomenclature of the present application at the "filter capacitor"). In contrast, the extraction of energy from the filter capacitor (directly at the output of the series regulator) would increase the voltage drop UCE across the regulating transistor T during discharge, and thus lead to increased voltage values and increased losses in the linear regulator 2, precisely in the case where the energy budget in the recharging operation is particularly critical.

Thus, the regulation of the DC-DC converter 3 to a constant voltage drop UCE also optimizes to a better efficiency when recharging the energy store after power has been extracted transiently there.

The optimization of the efficiency of a DC-DC converter in the power range of approximately 3.6 mA at 12 V is possible in practice only with integrated circuits, in which so-called "synchronous rectifiers" are installed, which can switch switching transistors on and off at very precise points in time. As a rule, the commercial components available on the market are designed for a constantly regulated output voltage. For this purpose, the integrated circuits have a voltage feedback input, which is designed such that the output voltage is to be connected here (possibly via a voltage divider).

Such switching regulators are diverted from their intended use by connecting to the voltage feedback input, not the output voltage of the DC-DC converter 3, but rather a control signal which is generated, for example, by a comparator 4 on the basis of the measured status of the collector-emitter voltage drop UCE across the series regulator. This diversion from the intended use is effective in particular in so-called "hysteresis DC-DC regulators," which have a voltage feedback input with two internal threshold values. First, such regulators can achieve particularly good efficiencies at the operating point 12 V/3.6 mA. Second, such regulators can be dynamically adjusted to a variable working current Ipeak in the switching regulator (for example, via a pin for connecting an external resistor for parameterization). Third, this type of regulator operates via the hysteresis thresholds at the voltage feedback input with a quasi digital operating mode, which can be controlled by a comparator.

Thus, a special integrated circuit does not need to be developed for the application; rather, the non-intended use of commercially available standard components with voltage feedback input is successful.

An energy extraction circuit 13 is connected downstream of the series regulator 2. The energy extraction circuit 13 is connected in parallel to the DC-DC converter 3. The energy extraction circuit 13 is designed, for example, as a second DC-DC converter. In one embodiment, the energy extraction circuit 13 is designed as a Darlington with two bipolar transistors. In the example in FIG. 3, the collector C is connected to the input of the energy extraction circuit and the filter capacitors 13 connected there.

Like the DC-DC converter 3, the output of the energy extraction circuit 13 is connected to the voltage limiter Z or the energy store C.

The first comparator 4 and/or the second comparator 14 may be designed as discretely constructed differential amplifiers.

The first DC-DC converter 3 and/or the second DC-DC converter 13 as a design of the energy extraction circuit can be designed as hysteresis converters. The desired hysteresis can be adjusted, for example, via a feedback resistor from the output of the comparator to the non-inverting input of the comparator.

The first DC-DC converter 3 and/or the second DC-DC converter 13 as a design of the energy extraction circuit can have a galvanic separation.

Reference is made below to FIG. 4.

At least one further DC-DC converter 200 which, for example, supplies the microcontroller 201 or another circuit, is connected downstream of the DC-DC converter. In this case, it is possible to briefly extract a certain amount of energy from the energy storage capacitor C and to discharge such energy storage capacitor C to a certain extent in the process. This operating mode is possible, because the DC-DC converter 3 is no longer regulated to a constant voltage at the output (i.e., at the capacitor C), but to a constant voltage UCE at the series regulator. The claimed circuit topology thus enables the installation of a large energy store.

The parallel connection of the voltage limitation measures at the capacitor C achieves the rated voltages to be guaranteed from a safety point of view being identical to the functional voltages, since the voltage limiter diodes also functionally assume the function to discharge excess power in the system if necessary. In this case, the excess power is discharged only when the energy storage capacitor C has already been fully charged.

In the case of low available power, the voltage at the capacitor and thus at the Zener diodes decreases. At the same time, in this low-power case, the leakage currents otherwise often strongly interfering at the limiting Zener diodes are reduced. Thus, the Zener diodes can be designed such that functional voltage and safety-related guaranteed peak voltage are close to one another. This simplifies the intrinsically safe design of the transmitter circuit, because limiting components of a smaller size can thus be used, for example.

An advantage of the DC-DC converter circuit is that the series regulator can in each case be operated at the minimum voltage drop UCE which is unavoidable for proper functioning, and that only the absolute minimum of energy is thus used in the series regulator. If, for example, a higher voltage drop UCE is required in the case of a higher loop current of, for example, >10 mA, the associated target voltage drop is increased at the comparator. In the case of lower loop currents, it is also possible to work with a smaller UCE value without impairing the function of the linear regulator. This exploits the property of the regulating transistor that, in the case of low currents, the UCE saturation voltage is significantly lower than in the case of higher currents.

If a digital HART communication is used, a higher UCE voltage may also be required, because the loop current must possibly be regulated more quickly or more precisely. Thus, the UCE voltage can be increased for the necessary duration of the HART communication operation. This is significant in that data is actually transmitted only for a fraction of the operating time in the HART operating case.

If a microcontroller is used in the system, it knows the current I_loop adjusted in the current loop, since it generally configures the series regulator via a control signal, for example, via a control signal 203 based on which the base current in the regulating transistor is adjusted. The microcontroller can specify the respective matching UCE nominal voltage of the DC-DC converters via a control signal. The same applies to a raising of the UCE nominal voltage that has possibly been carried out in the case of the HART operation.

Alternatively, the UCE nominal voltage can also be changed without a separate control signal of the microcontroller, for example, via an analog regulation based on the base current in the regulating transistor.

For a coil with a given saturation current, the efficiency of the DC-DC converter 3 is dependent on the selected current Ipeak up to which the storage inductivity of the DC-DC converter is supplied with current. In the critical case of 12 V/3.6 mA, a low current Ipeak is advantageous. In the case of higher adjusted currents and/or higher input voltages, a higher Ipeak is advantageous in order to, for example, charge the energy stores C more quickly or to extract more current at the filter capacitor at the input of the DC-DC converter. Typically, the switching regulators ICs integrated for parameterization have control inputs 204. A nominal current is adjusted via the corresponding pin of the integrated DC-DC converter circuit via a suitable resistor. A large resistor (or an open pin), for example, then corresponds to a high working current and a small resistor (pin connected to GND), e.g., to a lower working current.

This adjustment is changed dynamically depending on the operating case, in order to adjust the circuit to an optimum efficiency or a sufficiently high power extracted at the series regulator depending on the operating mode. For this purpose, switching back and forth between open floating and short-circuited to GND is carried out using a transistor or corresponding pin of a microcontroller, for example, and switching between minimum Ipeak (better efficiency, low extractable power) on the one hand and maximum working current Ipeak (poorer efficiency, more extractable power) thus takes place. For example, if a certain threshold value of the loop current of, for example, 10 mA is exceeded, as output on the control line for the series regulator 203.

Thus, at higher loop currents, the engagement of the bypass circuit or of the second DC-DC converter 13 can be avoided, because the first DC-DC converter 3 can already extract at the series regulator the power quantities required for the loop current of, for example, >10 mA. This optimizes overall efficiency.

In this case, use can be made of the fact that the microcontroller as a rule has knowledge about the current operating case and the respectively optimum adjustment of the working current of the DC-DC converter via the parameterization of the series regulator carried out by the microcontroller.

For the evaluation of the voltage drop across the series regulator and the corresponding generation of the control signal in the comparator for feeding in the voltage feedback input of the DC-DC regulator ICs, an accurate measurement of the voltage drop across the regulating transistor is required. The collector and emitter are, for example, operated at DC voltage levels in the range of the positive supply voltage, e.g., at +12 V, +30 V or +60 V. However, conventional low power comparators are designed for operating voltages of, for example, 1.8 V or +3.3 V. Therefore, the precise measurement of high voltages or of small differences in high voltages possibly requires the use of precision resistors, which adjust the input voltages to the permissible level range. This limits accuracy and generates increased component costs. However, conventional commercial comparator ICs for voltages of, for example, +30 V often do not have the low current consumption required in the present application.

A discretely constructed differential amplifier is used to evaluate the voltage difference UCE. FIG. 4 shows an example of such an embodiment. This circuit is designed to be optimized for operation at high input voltages at the comparator, for example, by using two NPN transistors 204, 205 in common-emitter topology as differential amplifiers, wherein the respective base connections are connected to the two voltages to be compared. Given the high input voltages, the use of additional voltage-resistant rectifier diodes 216, 217 at the two base connections is advantageous, since the base-emitter diodes of conventional transistors are not designed for reverse voltages of, for example, 30 V or 60 V, which could occur, for example, during start-up of the circuit. In this case, the UCE nominal voltages can be generated via a resistor chain connected to the emitter of the regulating transistor and a constant current source 212 which can be parameterized, for example, by the microcontroller via a control line 213. This avoids the use of precision resistors, which are required when using a conventional low-voltage comparator.

FIG. 4 shows a specific embodiment of FIG. 2 in the overview.

In this case, the series regulator transistor T is implemented by a sequence of two transistors in a cascode circuit 206, 207. The main regulating transistor 206 receives from a regulator circuit a base current, which is regulated on the basis of the voltage drop across a shunt resistor 209, such that the loop current I_loop in the current loop assumes the target value coded by the microcontroller 201 in the control signal 203.

In the exemplary embodiment, a cascode transistor 207, the base of which is supplied by a constant voltage source 210, provides a constant operating point of the main regulating transistor 206. The main objective of the present disclosure is to keep the voltage loss across the series regulator as small as possible, i.e., to operate with a minimum UCE value. Against this background, the use of a cascode stage with two transistors 206, 207 appears counterproductive at first glance, since now each of them requires a certain voltage drop for proper functioning. Contrary to intuition, however, it is advantageous in practice to work with a second transistor 207, whose base has a substantially constant value with respect to the voltage at the emitter of transistor 206. The present disclosure is based on the finding that this topology can also be used with considerably smaller UCE values per single transistor without interference signals generated by the switching regulator IC 214 coupling out to the current loop. When using a single transistor, disproportionately large UCE values would be required in order to compensate for the coupling of interference signals from the collector into the base of the transistor 206 via the so-called "Miller" capacitance. The cascode stage thus allows operating with smaller voltage drops, for example, UCE=0.4 V, for both transistors at a loop current I_loop of 3.6 mA, at which the power budget is particularly critical. However, it is important to increase, if necessary, the voltage drop in the case of higher loop currents of, for example, 20 mA, since proper functioning of the circuit can possibly only be ensured with a voltage drop of, for example, UCE=0.7 V at an increased current I_loop due to the saturation voltages in the transistors.

The filter capacitor C_Filter is located at the output of the series regulator this simultaneously buffers the input voltage of the DC-DC regulator circuit 214. The DC-DC converter includes a coil L and an output capacitor C. A Zener diode Z is connected in parallel to the output capacitor C.

The voltage drop UCE within the meaning of this application results in this case from the sum of the voltage drop across both transistors 206, 207. The target value of the voltage drop UCE_SOLL is controlled here via a parameterizable constant current source 212 with a control input 213, which is controlled by a microcontroller 201 for varying the target voltage drop UCE_Soll. By varying the adjusted constant current, the voltage UCE_Soll dropping at the resistor 211 can be controlled. The voltage at the resistor 211 is switched 204 to the first input of the discretely implemented comparator, while the voltage at the output of the series regulator is switched to the second input 205.

In the exemplary embodiment, the output of the discretely implemented comparator 14 is connected to the control input FB (3s) of the switching regulator ICs 214. A signal from the microcontroller is connected via a control line 204 to the switching regulator IC 214 in order to adjust the peak current Ipeak in the coil L. The microcontroller is supplied from a second DC-DC converter 200, so that the voltage across the storage capacitor C can vary without impairing system function.

Only one DC-DC converter is shown in FIG. 4 for the sake of clarity. The circuit topology of the second DC-DC converter with lower efficiency but higher peak currents for discharging the filter capacitor C_Filter can be realized with a similar discrete differential amplifier/comparator.

In one embodiment, in addition to the current source 212, the voltage source 210 of the cascode stage is also adjusted, similarly to the UCE target value, to higher or lower voltages depending on the loop current and operating case (HART active or not).

The invention claimed is:

1. A switching regulator circuit comprising:
a series regulator having a regulating transistor having a collector, a base, and an emitter;
a first DC-DC converter connected downstream of the series regulator;
a first comparator having an output connected to a control input of the first DC-DC converter, wherein the first comparator is configured to compare a collector-emitter voltage drop across the regulating transistor to a target value; and
a microcontroller which specifies the target value for the collector-emitter voltage drop and passes the target value to the first comparator, wherein the target value is subtracted from a voltage value at an input of the first comparator,
wherein the switching regulator circuit is designed such that the first DC-DC converter is regulated to hold constant the collector-emitter voltage drop, and
wherein the switching regulator circuit is designed to activate the first DC-DC converter in such a way to hold constant the collector-emitter voltage drop.

2. The switching regulator circuit according to claim 1, wherein the first DC-DC converter is a step-down converter.

3. The switching regulator circuit according to claim 1, wherein the control input of the first DC-DC converter is a voltage feedback control input.

4. The switching regulator circuit according to claim 1, further comprising:
a capacitor connected downstream of the first DC-DC converter.

5. The switching regulator circuit according to claim 1, further comprising:
a voltage limiter, including a Zener diode, connected downstream of the first DC-DC converter.

6. The switching regulator circuit according to claim 1, wherein the first DC-DC converter further includes an input for adjusting a maximum working current of the first DC-DC converter.

7. The switching regulator circuit according to claim 1, further comprising:
a second comparator with two inputs and one output, wherein the second comparator compares the collector-emitter voltage drop across the regulating transistor to a second target value; and
an energy extraction circuit, wherein the output of the second comparator is connected to the energy extraction circuit.

8. The switching regulator circuit according to claim 7, wherein the energy extraction circuit is a second DC-DC converter.

9. The switching regulator circuit according to claim 7, wherein the first and/or the second comparator is a differential amplifier constructed from discrete circuit components.

10. The switching regulator circuit according to claim 8, wherein the first and/or the second DC-DC converter is a hysteresis converter.

11. The switching regulator circuit according to claim 8, wherein the first and/or the second DC-DC converter is embodied with a galvanic separation between a voltage input and a voltage output of the respective DC-DC converter.

12. A field device, comprising:
a switching regulator circuit, including:
a series regulator having a regulating transistor having a collector, a base, and an emitter;
a DC-DC converter connected downstream of the series regulator;
a first comparator having an output connected to a control input of the first DC-DC converter, wherein the first comparator is configured to compare a collector-emitter voltage drop across the regulating transistor to a target value; and
a microcontroller which specifies the target value for the collector-emitter voltage drop and passes the target value to the first comparator, wherein the target value is subtracted from a voltage value at an input of the first comparator,
wherein the switching regulator circuit is designed such that the DC-DC converter is regulated to hold constant the collector-emitter voltage drop, and
wherein the switching regulator circuit is designed to activate the DC-DC converter in such a way to hold constant the collector-emitter voltage drop.

13. A method for supplying power to a field device, wherein the field device includes:
- a switching regulator circuit, including:
    - a series regulator having a regulating transistor having a collector, a base, and an emitter;
    - a DC-DC converter connected downstream of the series regulator;
    - a first comparator having an output connected to a control input of the first DC-DC converter, wherein the first comparator is configured to compare a collector-emitter voltage drop across the regulating transistor to a first target value; and
    - a microcontroller which specifies the first target value for the collector-emitter voltage drop and passes the first target value to the first comparator, wherein the first target value is subtracted from a voltage value at an input of the first comparator,
    - wherein the switching regulator circuit is designed such that the DC-DC converter is regulated to hold constant the collector-emitter voltage drop, and
    - wherein the switching regulator circuit is designed to activate the DC-DC converter in such a way to hold constant the collector-emitter voltage drop, the method comprising:
- setting the first target value for the collector-emitter voltage drop of the series regulator; and
- regulating the DC-DC converter to hold constant the collector-emitter voltage drop across the series regulator, wherein the regulating includes activating the DC-DC converter so that the constant collector-emitter voltage drop.

14. The method according to claim 13, wherein the DC-DC converter is a step-down converter.

15. The method according to claim 13, wherein the first target value for the collector-emitter voltage drop is adjusted as a function of a current in the base or in the emitter of the series regulator.

16. The method according to claim 13, wherein the collector-emitter voltage drop is dependent on a signal impressed into a current in the base of the regulating transistor in the series regulator or on a control signal.

17. The method according to claim 13, further comprising:
- comparing the first target value of the collector-emitter voltage drop to the collector-emitter voltage drop, wherein the first target value is subtracted from the collector-emitter voltage drop at an input of the comparator.

18. The method according to claim 13, further comprising:
- adjusting a maximum working current at the DC-DC converter as a function of a current into the base of the series regulator and/or as a function of a signal impressed into the current in the base of the series regulator.

19. The method according to claim 13, further comprising:
- controlling an energy extraction circuit as a function of a second target value for the collector-emitter voltage drop.

20. The method according to claim 13, further comprising:
- charging an energy store by the DC-DC converter.

21. The method according to claim 13, further comprising:
- limiting a voltage downstream of the DC-DC converter.

* * * * *